(12) United States Patent
Morozov et al.

(10) Patent No.: US 10,476,604 B2
(45) Date of Patent: Nov. 12, 2019

(54) TRANSMITTER-RECEIVER SEPARATION SYSTEM FOR FULL-DUPLEX UNDERWATER ACOUSTIC COMMUNICATION SYSTEM

(71) Applicant: Teledyne Instruments, Inc., Thousand Oaks, CA (US)

(72) Inventors: Andrey K. Morozov, North Falmouth, MA (US); Kenneth F. Scussel, East Falmouth, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 0 days.

(21) Appl. No.: 16/018,652

(22) Filed: Jun. 26, 2018

(65) Prior Publication Data

US 2019/0007145 A1 Jan. 3, 2019

Related U.S. Application Data

(60) Provisional application No. 62/525,991, filed on Jun. 28, 2017.

(51) Int. Cl.
*H04B 11/00* (2006.01)
*H04B 13/02* (2006.01)

(52) U.S. Cl.
CPC .............. *H04B 11/00* (2013.01); *H04B 13/02* (2013.01)

(58) Field of Classification Search
CPC .......... H04B 11/00; H04B 13/02; H04B 1/38; H04B 1/69; H04B 7/0617; H04B 13/00;
(Continued)

(56) References Cited

U.S. PATENT DOCUMENTS 2,901,997 A 9/1959 Brooks
3,056,104 A 9/1962 De Kanski et al.
(Continued)

FOREIGN PATENT DOCUMENTS

EP 0238736 A1 9/1987

OTHER PUBLICATIONS

Morozov, A., "Doubly-Resonant Underwater Acoustic Projector for Long-Range Communications and Position," Woods Hole Oceanographic Institution, downloaded from http://www.whoi.edu/hpb/viewPage.do?id=1533&cl=4 on Apr. 4, 2015.
(Continued)

*Primary Examiner* — Isam A Alsomiri
*Assistant Examiner* — Amie M Ndure
(74) *Attorney, Agent, or Firm* — K&L Gates LLP

(57) ABSTRACT

In one aspect, an acoustic full-duplex communication system includes a transmitter array having at least two transmitters. The transmitters are positioned along an axis of maximum transmission and are separated by about half of a wavelength of a transmission frequency band. The transmitters transmit waveforms of opposing polarity that mutually interfere in a plane orthogonal to the transmission axis. The system includes a receiver array having at least one receiver in the orthogonal plane. In a second aspect, an underwater acoustic full-duplex communication system includes a transmitter and two receivers. The receivers are symmetrically positioned about an axis, separated by about half of a wavelength of a transmission frequency band, and equidistant from the transmitter. The receivers are connected in opposing polarity. Either aspect may include an adaptive filter to improve cancellation of transmitter originated near field transmissions received by the one or more receivers.

20 Claims, 9 Drawing Sheets

(58) Field of Classification Search
CPC .... H04B 15/00; H04B 1/7103; H04B 5/0031;
H04B 5/0037; H04B 10/00; H04B
10/077; H04B 10/112; H04B 10/116;
H04B 10/25; H04B 10/27; H04B 10/40;
H04B 10/50; H04B 10/548; H04B 10/60;
H04B 10/80; H04B 13/005; H04B
17/327; H04B 17/354; H04B 17/382;
H04B 17/391; H04B 1/034; H04B 1/04;
H04B 1/0475; H04B 1/3827; H04B 1/40;
H04B 1/44; H04B 1/48; H04B 1/713;
H04B 1/74; H04B 2001/6912; H04B
3/52; H04B 5/00; H04B 5/0006; H04B
5/0075; H04B 7/15528; H04B 7/26;
G08C 23/02; G08C 17/02; H04R 1/44;
H04R 2499/11; H04R 1/222; H04R 3/04;
H04R 1/00; H04R 1/22; H04R 2217/03;
H04R 23/00; H04R 2420/07; H04R
27/00; H04R 29/004; H04R 3/00; H04R
17/00; H04R 17/02; H04R 19/00; H04R
1/028; H04R 1/04; H04R 1/083; H04R
1/1016; H04R 1/1041; H04R 1/40; H04R
1/46; H04R 2205/024; H04R 2410/07;
H04R 2420/01; H04R 2460/13; H04R
2499/13; H04R 2499/15; H04R 29/001;
H04R 3/12; H04R 5/02; H04R 5/033;
H04R 5/04; H04R 7/04; G06K 7/1095;
G06K 9/00718; G06K 9/4652; G06K
9/4661; G09C 5/00

See application file for complete search history.

(56) References Cited

U.S. PATENT DOCUMENTS

| | | | |
|---|---|---|---|
| 3,105,456 A | 10/1963 | Gongwer | |
| 3,194,207 A | 7/1965 | Dunne | |
| 3,219,970 A | 11/1965 | Sims | |
| 3,351,941 A * | 11/1967 | Page | F41G 7/24 244/3.13 |
| 3,578,102 A | 5/1971 | Ross et al. | |
| 3,676,840 A | 7/1972 | Bays | |
| 3,720,908 A | 3/1973 | McCoy et al. | |
| 3,986,669 A | 10/1976 | Martner | |
| 4,135,142 A | 1/1979 | Percy et al. | |
| 4,142,171 A | 2/1979 | Pickens | |
| 4,198,706 A | 4/1980 | Elliot | |
| 4,359,962 A | 11/1982 | Olsson et al. | |
| 4,381,044 A | 4/1983 | Kirby | |
| 4,396,088 A | 8/1983 | Bayhi | |
| 4,400,805 A | 8/1983 | Nadler | |
| 4,483,411 A | 11/1984 | Mifsud | |
| 4,556,120 A | 12/1985 | Kirby | |
| 4,646,276 A | 2/1987 | Kowalewski et al. | |
| 4,855,964 A | 8/1989 | Fanning et al. | |
| 4,961,175 A | 10/1990 | Blue et al. | |
| 4,961,181 A | 10/1990 | Elliott | |
| 5,087,850 A | 2/1992 | Suzuta | |
| 5,198,713 A | 3/1993 | Suzuta | |
| 5,210,718 A | 5/1993 | Bjelland et al. | |
| 5,831,571 A * | 11/1998 | Rickett | F41G 7/28 342/62 |
| 5,999,491 A | 12/1999 | Harvey et al. | |
| 6,076,629 A | 6/2000 | Tengham | |
| 6,085,862 A | 7/2000 | Tengham | |
| 6,782,109 B2 | 8/2004 | Sheplak et al. | |
| 7,266,046 B1 | 9/2007 | Ruffa | |
| 7,633,835 B1 | 12/2009 | Erikson et al. | |
| 7,823,689 B2 | 11/2010 | Aronstam et al. | |
| 8,120,457 B2 | 2/2012 | Hu et al. | |
| 8,331,198 B2 | 12/2012 | Morozov et al. | |
| 8,400,872 B2 | 3/2013 | Gulgné et al. | |
| 8,411,764 B2 * | 4/2013 | Nelson | G06K 7/10297 340/10.5 |
| 8,441,892 B2 | 5/2013 | Morozov et al. | |
| 8,570,835 B2 | 10/2013 | Chelminski | |
| 8,624,710 B2 * | 1/2014 | Nelson | G06K 7/10217 340/10.3 |
| 8,634,276 B2 | 1/2014 | Morozov et al. | |
| 8,670,293 B2 | 3/2014 | Morozov | |
| 8,689,935 B2 | 4/2014 | Wilson et al. | |
| 8,942,060 B2 | 1/2015 | Abma et al. | |
| 9,222,836 B2 * | 12/2015 | Conti | G01J 3/0202 |
| 9,383,463 B1 | 7/2016 | Morozov et al. | |
| 9,475,282 B2 | 10/2016 | Kashimura et al. | |
| 10,139,503 B2 | 11/2018 | Morozov et al. | |
| 10,144,035 B1 | 12/2018 | Morozov et al. | |
| 2004/0112594 A1 | 6/2004 | Aronstam et al. | |
| 2006/0059801 A1 | 3/2006 | Allaei | |
| 2007/0296393 A1 | 12/2007 | Malpas et al. | |
| 2010/0039900 A1 | 2/2010 | McAleenan et al. | |
| 2013/0001010 A1 | 1/2013 | Wilson et al. | |
| 2013/0010573 A1 | 1/2013 | Morozov et al. | |
| 2014/0056108 A1 | 2/2014 | Chelminski | |
| 2014/0118521 A1 * | 5/2014 | Conti | G01J 3/0202 348/77 |
| 2016/0011051 A1 * | 1/2016 | Conti | G01J 3/0202 382/162 |
| 2017/0276812 A1 | 9/2017 | Morozov | |
| 2019/0057680 A1 | 2/2019 | Morozov | |
| 2019/0060953 A1 | 2/2019 | Morozov et al. | |

OTHER PUBLICATIONS

Morozov, A., "Modeling and Testing of Carbon-Fiber Doubly-Resonant Underwater Acoustic Transducer," Proceedings of the 2013 COMSOL Conference in Boston.

Avedik F. et al. "Single Bubble Air-Gun Array for Deep Exploration," Geophysics Society of Exploration. vol. 58. No. 3. Mar. 1, 1993, pp. 366-382.

Morozov et al.: "High-efficient tunable sound sources for ocean and bottom tomography, 15 years of operating history", OCEANS, IEEE, 2016, 10 pages.

Medini et al., "A Current-Controlled Variable-Inductor for High Frequency Resonant Power Circuits", 9th Annual Applied Power Electronics Conference and Exposition, 1994, vol. 1, pp. 219-225.

Morozov et al.: "Underwater tunable organ-pipe sound source", The Journal of the Acoustical Society of America, vol. 122, Issue 2, Aug. 2007, pp. 777-785.

Morozov et al., "A Sound Projector for Acoustic Tomography and Global Ocean Monitoring", IEEE Journal of Oceanic Engineering, vol. 28, No. 2, Apr. 2003, pp. 174-185.

Masmoudi et al., "Channel Estimation and Self-Interference Cancelation in Full-Duplex Communication Systems", IEEE Transactions on Vehicle Technology, vol. 66, No. 1, Jan. 2017, pp. 321-334.

Li et al., "An investigation into Baseband Techniques for Single-Channel Full-Duplex Wireless Communication Systems", IEEE Transactions on Wireless Communications, vol. 13, No. 9, Sep. 2014: pp. 4794-4806.

Decarpigny et al., "The Design of Low-Frequency Underwater Acoustic Projectors: Present Status and Future Trends", IEEE Journal of Oceanic Engineering, vol. 16, No. 1, Jan. 1991, 16 pages.

Buchner et al., "Wave-Domain Adaptive Filtering: Acoustic Echo-Cancellation for Full Duplex Systems Based on Wave-Field Synthesis", IEEE International Conference on Acoustics, Speech, and Signal Processing, 2004 pp. iv-117-120.

Korpi et al., "Full-Duplex Mobile Device: Pushing the Limits", IEEE Communications Magazine, Sep. 2016, pp. 80-87.

Duda et al., "Evaluation of a Long-Range Joint Acoustic Navigation/Thermometry System", Proceedings of Oceans, 2006: 6 pages.

Sagen et al., Acoustic Technologies for Observing the anterior of the Arctic Ocean, OceanObs '09, Venice, Italy, Sep. 2009, 5 pages.

Webb et al., A New Approach to Low Frequency Wide-Band Projector Design, Proceedings of Oceans, 2002, pp. 2342-2349, 8 pages.

(56) References Cited

OTHER PUBLICATIONS

Bharadia et al., "Full Duplex Radios", SiGCOMM' 13, Hong Kong, China, Aug. 12-16, 2013, 12 pages.

Zhang et al., "Full-Duplex Wireless Communications: Challenges, Solutions, and Future Research Directions", Proceedings of the IEEE, vol. 104, No. 7, Jul. 2016, pp. 1369-1409.

Xie et al., "Evaluating the Feasibility of Establishing Full-Duplex Underwater Acoustic Channels", In Proc. Third Annual Mediterranean Ad Hoc Networking Workshop (MedHoc), Bordrum, Turkey, Jun. 2004, 10 pages.

Gibson et al., "On the Impacts and Benefits of Implementing Full-Duplex Communications Links in an Underwater Acoustic Network", In Proc of 5th International Mine Symposium, Naval Postgraduate School, Monterey, Mar. 2002, 10 pages.

Kramer el al., Seismic Energy Sources, First Annual Offshore Technology Conference, Houston, Texas, May 18. 1969, Paper No. OTC 1119, 30 pages.

Morozov et al., "Underwater Acoustic Technologies for Long-Range Navigation and Communications in the Arctic", http://promitheas.iacm.forth.gr/UAM—Proceedings/view—paper.php?pageid=384, Jun. 2011, 8 pages.

Sims, "Bubble Transducer for Radiating High-Power Low-Frequency Sound in Water", The Journal of the Acoustical Society of America, vol. 32, No. 10, Oct. 1960, 4 pages.

Ensign et al., "Electroacoustic Performance Modeling of the Gas-Filled Bubble Projector", Presented at Third international Workshop on Transducers for Sonics and Ultrasonics, May 6-8, 1992, Naval Research Lab. Orlando, Florida, pp. 268-275.

Freitag et al., "Under-Ice Acoustic Communications and Navigation for Gliders and AUVs", American Geophysical Union, Fall Meeting 2009, abstract #OS43B-1389. Feb. 2009, 2 pages.

Morozov et al., "Underwater Sound Source with Tunable Resonator for Ocean Acoustic Tomography", J. Acoust. Soc. Am., vol. 116, No. 4, Part 2, Oct. 2004, 3 pages.

\* cited by examiner

TRANSMITTER-RECEIVER SEPARATION SYSTEM FOR FULL-DUPLEX UNDERWATER ACOUSTIC COMMUNICATION SYSTEM

CROSS-REFERENCE TO RELATED APPLICATIONS

This application claims priority under 35 U.S.C. § 119 to U.S. Provisional Patent Application Ser. No. 62/525,991, filed Jun. 28, 2017, and titled TRANSMITTER-RECEIVER SEPARATION SYSTEM FOR FULL-DUPLEX UNDERWATER ACOUSTIC COMMUNICATION SYSTEM, the disclosure of which is hereby incorporated by reference herein in its entirety and for all purposes.

BACKGROUND

Aspects of the present application are related to the following non-patent literature documents, the disclosure of each of which is incorporated herein by reference in its entirety and for all purposes: "Full-Duplex Wireless Communications: Challenges, Solutions, and Future Research Directions" by Zhongshan Zhang, Keping Long, Athanasios V. Vasilakos, and Lajos Hanzo. Proceedings of the IEEE, Vol. 104, No. 7, July 2016, pp. 1369-1409; "Evaluating the Feasibility of Establishing Full-Duplex Underwater Acoustic Channels" by G. Xie, J. Gibson, and K. Bektas. In Proc. Third Annual Mediterranean Ad Hoc Networking Workshop (MedHoc), Bordrum, Turkey, June 2004; "On the Impacts and Benefits of Implementing Full-Duplex Communications Links in an Underwater Acoustic Network" by J. Gibson, A. Larraza, J. Rice, K. Smith, and G. Xie. In Proc of 5th International Mine Symposium, Naval Postgraduate School, Monterey, March 2002; "Channel Estimation and Self-Interference Cancelation in Full-Duplex Communication Systems" by Ahmed Masmoudi and Tho Le-Ngoc. IEEE Transactions on Vehicle Technology, Vol. 66, No 1, January 2017, pp. 321-334; "An Investigation Into Baseband Techniques for Single-Channel Full-Duplex Wireless Communication Systems" by Shenghong Li and Ross D. Murch. IEEE Transactions on Wireless Communications, Vol. 13, No. 9, September 2014, pp. 4794-4806; "Full-Duplex Mobile Device: Pushing the Limits" by Dani Korpi, Joose Tamminen, Matias Turunen, Timo Huusari, Yang-Seok Choi, Lauri Anttila, Shilpa Talwar, and Mikko Valkama. IEEE Communications Magazine•September 2016 pp. 80-87; "Full Duplex Radios" by Dinesh Bharadia, Emily McMilin and Sachin Katti. SIGCOMM' 13, August 12-16, 2013, Hong Kong, China; and "Wave-Domain Adaptive Filtering: Acoustic Echo-Cancellation for Full Duplex Systems Based On Wave-Field Synthesis" by Herbert Buchner, Sascha Spors, and Walter Kellermann. Proceedings of ICASSP 2004 pp. iV-117-120.

It is recognized that there is an increased interest in wireless underwater communication services. An underwater acoustic communication channel may have a limited usable frequency spectrum, so spectral efficiency is a key driver in the communications research field. Due to the material properties of water in the deep sea environment, an underwater acoustical system typically requires a transmitter signal power that is many orders of magnitude greater than the required receiver signal powers (often by over 100-120 dB). This power differential arises because sound signals attenuate rapidly with distance under water. It has thus been widely held that a deep water acoustic system cannot simultaneously transmit and receive at the same frequency because a higher powered transmission signal would cause self-interference at the receiver. Such self-interference would thereby obscure the received signal by being overpowered by the transmitted signal.

The issue of self-interference has previously prevented the realization of in-band full-duplex underwater acoustic communications. At present, some acoustic communications systems have achieve full duplex operation by using uplink and downlink channels separated in time by using time-division duplexing (TDD). Alternatively, some acoustic communications systems have achieve full duplex operation by using uplink and downlink channels separated in frequency, using the frequency-division duplexing (FDD). Such TDD and FDD techniques may thereby avoid co-channel self-interference (SI).

Despite the present use of time- and/or frequency-division duplexing, full-duplex in-band systems for the underwater acoustic communications may demonstrate an obvious benefit of spectral efficiency by potentially providing twice the information capacity of the other systems. It is therefore desirable to develop a full-duplex in-band system for underwater acoustic communications to take advantage of the increased spectral efficiency available therefrom.

SUMMARY

An aspect of a communication system for underwater acoustic full-duplex communication may include a transmitter composed of a transmitter array, in which the transmitter array includes a first transmitter and a second transmitter, and a receiver composed of a receiver array. In the transmitter array the first transmitter and the second transmitter are positioned along an axis of a radiation pattern maximum, separated by a distance approximately equal to a half wavelength of a central frequency of the working frequency band, and configured to transmit waveforms with opposite polarity that interfere to produce near-zero sound pressure in a silent plane perpendicular to the axis. In the receiver array at least one receiver is positioned in the silent plane.

In one aspect of the communication system, the first transmitter and the second transmitter are positioned in a near field of the transmitter.

In one aspect of the communication system, the receiver array includes one receiver positioned an equal distance between the first transmitter and the second transmitter.

In one aspect of the communication system, the receiver array includes a plurality of receivers positioned in the silent plane.

An aspect of a communication system for underwater acoustic full-duplex communication may include a first transmitter configured to transmit a first signal with a first polarity, a second transmitter configured to transmit a second signal with a second polarity, in which the second polarity is opposite the first polarity, and in which the first transmitter and the second transmitter are positioned along an axis extending through a center of the first transmitter and a center of the second transmitter, a receiver positioned on the axis, and an adaptive processor in communication with the first transmitter, the second transmitter, and the receiver. The first transmitter and the second transmitter may be separated by a distance approximately equal to a quarter wavelength of a central frequency of the working frequency band. The adaptive processor may be configured to receive an output signal from the receiver and apply a stochastic gradient adaptive filter to the output signal. The stochastic gradient adaptive filter may be configured to equalize a first amplitude of the first signal with a second amplitude of the second signal, and equalize a first delay of the first signal with a second delay of the second signal.

In one aspect of the communication system, the stochastic gradient adaptive filter includes a least mean squares filter.

In one aspect of the communication system, applying the least mean squares filter makes any residual signal in a near field of the receiver near-zero.

In one aspect of the communication system the stochastic gradient adaptive filter includes a recursive least squares filter.

In one aspect of the communication system, applying the recursive least squares filter makes any residual signal in a near field of the receiver near-zero.

An aspect of a communication system for underwater acoustic full-duplex communication may include a transmitter and a first receiver set composed of a first receiver and a second receiver. The first receiver and the second receiver may be separated by a distance approximately equal to a half wavelength of a central frequency of the working frequency band, symmetrically positioned along a first axis an equal distance from the transmitter, and connected in parallel in an opposite polarity, The first receiver and the second receiver may be configured to output a near-zero signal in response to a signal transmitted by the transmitter and output a non-zero signal in response to any signal arriving from a direction different than orthogonal to the first axis.

In one aspect, the communication system may further include a second receiver set including a third receiver and a fourth receiver. The third receiver and the fourth receiver may be separated by the distance approximately equal to the half wavelength of the central frequency of the working frequency band, symmetrically positioned along a second axis an equal distance from the transmitter, in which the second axis is perpendicular to the first axis, and connected in parallel in an opposite polarity. The third receiver and the fourth receiver may be configured to output a near-zero signal in response to the signal transmitted by the transmitter, and output a non-zero signal in response to any signal arriving from a direction different than orthogonal to the second axis.

In one aspect, the communication system may further include a receiver composed of a receiver array, in which the receiver array includes a plurality of receiver sets, that may further include the first receiver set and the second receiver set.

An aspect of a communication system for underwater acoustic full-duplex communication, may include a transmitter and a receiver composed of an array of receivers, in which the array of receivers may include at least one vector sensor receiver. Each vector sensor receiver may have an X-axis, a Y-axis, and a Z-axis in which the Z-axis of the at least one vector sensor receiver is positioned in the direction of a signal transmitted by the transmitter to output a near-zero signal in the X-axis direction and the Y-axis direction.

An aspect of a communication system for underwater acoustic full-duplex communication may include a first receiver and a second receiver in which the first receiver and the second receiver are positioned along an axis extending through a center of the first receiver and a center of the second receiver, a transmitter positioned on the axis, in which the first receiver is configured to receive a first signal from the transmitter and the second receiver is configured to receive a second signal from the transmitter, and an adaptive processor in communication with the first receiver and the second receiver. The first receiver and the second receiver may be separated by a distance approximately equal to a quarter wavelength of a central frequency of the working frequency band. The adaptive processor may be configured to receive an output signal from the second receiver and apply a stochastic gradient adaptive filter to the output signal. The stochastic gradient adaptive filter may function to equalize a second amplitude associated the second signal received by the second receiver with a first amplitude associated with the first signal received by the first receiver and equalize a second delay associated with the second signal received by the second receiver with a first delay associated with the first signal received by the first receiver.

In one aspect of the communication system, the stochastic gradient adaptive filter includes at least one of a least mean squares filter or a recursive least squares filter to make any residual signal in a near field of the first receiver and the second receiver near-zero.

An aspect of a transmitter for underwater acoustic full-duplex communication may include a transmitter array composed of a first transmitter and a second transmitter, in which the first transmitter and the second transmitter are positioned along an axis of a radiation pattern maximum, separated by a distance approximately equal to a half wavelength of a central frequency of the working frequency band, and configured to transmit waveforms with opposite polarity to at least one receiver positioned in a plane perpendicular to the axis such that the waveforms interfere to produce near-zero sound pressure in the plane.

An aspect of a system for underwater acoustic full-duplex communication may include an adaptive processor configured to receive an output signal from a receiver positioned on an axis extending through a center of a first transmitter and a center of a second transmitter positioned along the axis, in which the first transmitter and the second transmitter are separated by a distance approximately equal to a quarter wavelength of a central frequency of the working frequency band. The adaptive processor may further be configured to apply a stochastic gradient adaptive filter to the output signal to equalize a first amplitude of a first signal having a first polarity transmitted by the first transmitter with a second amplitude of a second signal having a second polarity opposite the first polarity transmitted by the second transmitter and equalize a first delay of the first signal with a second delay of the second signal.

An aspect of a receiver for underwater acoustic full-duplex communication may include a receiver array composed of a first receiver set including a first receiver and a second receiver, and a second receiver set including a third receiver and a fourth receiver. The first receiver and the second receiver may be separated by a distance approximately equal to a half wavelength of a central frequency of the working frequency band, symmetrically positioned along a first axis an equal distance from a transmitter, and connected in parallel in an opposite polarity. The first receiver and the second receiver may be configured to output a near-zero signal in response to a signal transmitted by the transmitter and output a non-zero signal in response to any signal arriving from a direction different than orthogonal to the first axis. The third receiver and the fourth receiver may be separated by the distance approximately equal to the half wavelength of the central frequency of the working frequency band, symmetrically positioned along a second axis an equal distance from the transmitter, in which the second axis is perpendicular to the first axis, and connected in parallel in an opposite polarity. The third receiver and the fourth receiver may be configured to output a near-zero signal in response to the signal transmitted by the transmitter and output a non-zero signal in response to any signal arriving from a direction different than orthogonal to the second axis.

An aspect of a receiver for underwater acoustic full-duplex communication may include an array of receivers composed of at least one vector sensor receiver, in which each vector sensor receiver has an X-axis, a Y-axis, and a Z-axis, and wherein the Z-axis of the at least one vector sensor receiver is positioned in the direction of a signal transmitted by a transmitter to output a near-zero signal in the X-axis direction and the Y-axis direction.

An aspect of a system for underwater acoustic full-duplex communication may include an adaptive processor configured to receive an output signal from a second receiver of a pair of receivers, and apply a stochastic gradient adaptive filter to the output signal to equalize a second amplitude associated with a second signal received by the second receiver from a transmitter positioned on the axis with a first amplitude associated with a first signal received by the first receiver from the transmitter; and equalize a second delay associated with the second signal received by the second receiver from the transmitter with a first delay associated with the first signal received by the first receiver from the transmitter. The first receiver and the second receiver may be positioned along an axis extending through a center of the first receiver and a center of the second receiver, and the first receiver and the second receiver may be separated by a distance approximately equal to a quarter wavelength of a central frequency of the working frequency band.

DETAILED DESCRIPTION

Figure 1:
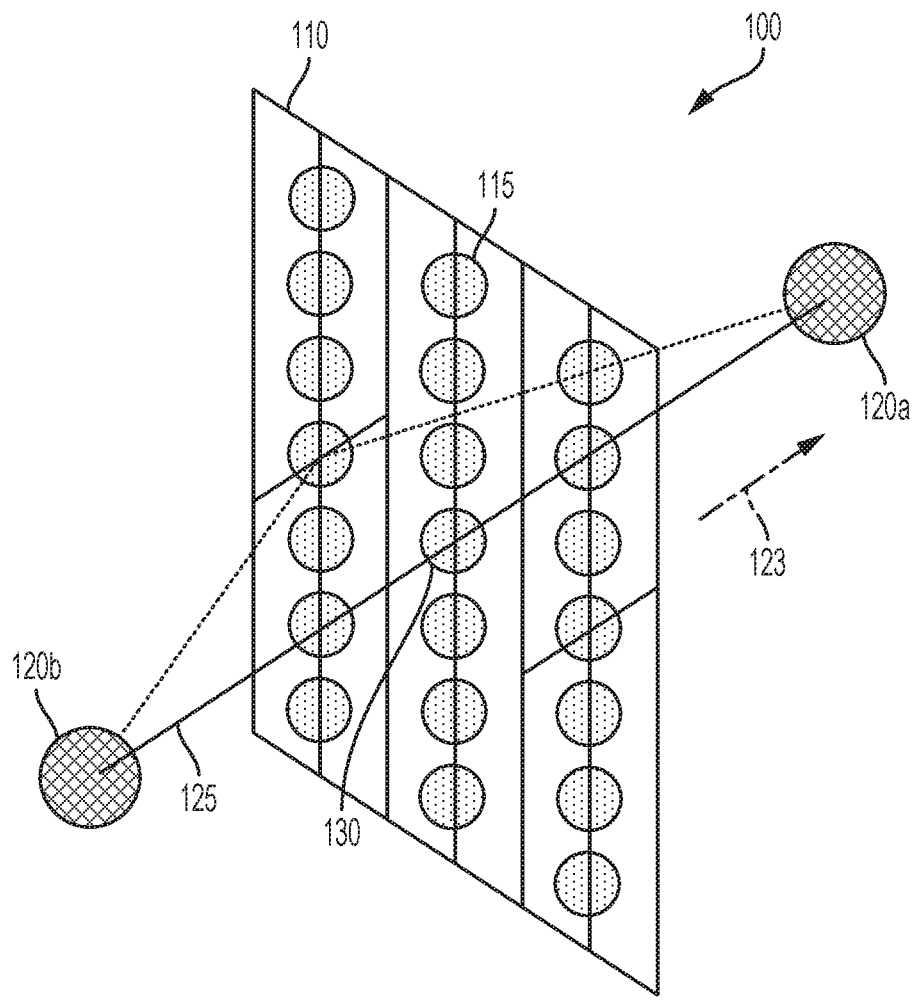
FIG. 1 depicts a diagram of a planar array of receivers disposed between two transmitters according to at least one aspect of the present disclosure.

As disclosed above, it may be necessary to achieve the 100-120 dB levels of self-interference cancellation required over wide bandwidths for underwater acoustic full-duplex in-band communication. Such self-interference (SI) cancelling methods at those power levels may be challenging. The dynamic range limitations of integrated electronics may restrict the transmitter power levels and receiver noise floor levels. As a result, an advanced solution of the self-interference problem may be found at the physical layer (transducer/near field) of a standard OSI communication model.

Disclosed herein are some aspects for in-band separation of simultaneously transmitted and received signals in a wave domain at a physical level within the near field zone of the transducers. Two groups of methods and their related systems are disclosed herein. Advantages of such methods and systems may include: increased informational capacity of an underwater acoustic channel by up to two times; increased efficiency of underwater acoustic networks; and increased reliability of the acoustic communications.

Full duplex (FD) wireless communication has drawn significant interest due to the potential for doubling network capacity at the physical (OSI) layer and offering numerous other benefits at higher OSI layers. It is a well recognized commercial opportunity for the 5G wireless communication market and new generation of WiFi networks. However, there may be challenges in achieving 100-120 dB levels of self-interference cancellation required over the wide bandwidths. Presently recognized limitations of full-duplex communications may include limited dynamic range and non-linearity, and long time spread and non-constant echoes from the powerful transmitted signal. The dynamic range limitations of integrated electronics may restrict the transmitter power levels and receiver noise floor levels and may require an advanced solution at the physical OSI layer (transducer/near field). Advances in compact antenna interfaces for full duplex are also required. Non-constant echoes having a large time spread may require the development of 256-512 tap echo-cancellers comprising a short adaptation time. Finally, networks employing full duplex may require a complete reconsideration of the medium access control OSI layer as well as cross-layer interaction and co-design.

The combination of full-duplex with frequency hopping or CDMA (code-division multiple access) can provide one easy and reliable solution. Some radio frequency (RF) communication journals have published papers describing recent research showing promising practical results that address these challenges. However, there are no standard or commercialized solutions for full duplex 5G wifi communication to date. Presently, there are no single-solution techniques to achieve the necessary suppression of self-interference in wireless systems. At best, a combination of two or even three methods are available. Some common practically validated methods for SI suppression in wireless communication may include:

Method 1. Maximum isolation of receiving signal from a transmitter in the antenna and the antenna interfaces;

Method 2. Analog adaptive SI cancelling just after RF transmitter and receiver interfaces;

Method 3. Multipath echo cancellation with adaptive LMS (least mean squares), or RLS (recursive least squares) processor;

Method 4. Non-linearity cancellation.

Maximum isolation methods may be realized at the physical OSI level and are specific to RF radiation, reception, and near field propagation. Such methods are presently under initial development, but there is no one single best solution at this time.

Analog adaptive self-interference cancelling methods typically use known least mean square (LMS) algorithms for SI cancellation. LMS algorithms typically use a series of digitally shifted copies of the transmitted signal that are then converted to analog signals and subtracted from the analog signal at the receiver channel. The SI estimation can be performed digitally following a digital-to-analog conversion and subtracting the analog results from the received signals. Alternatively, analog delays, controllable phase shifters, and gain controllers may be used to produce directly the analog signals for the subtraction step. This group of methods may use well established algorithms that may differ only in their implementation. A fully analog form of these suppressors may be preferable since the digital versions may require digital-to-analog conversion devices having a minimum of 12-16 bit resolution.

Multipath echo cancellation methods are well established echo-cancellation techniques. These techniques may require more than 256 filter taps and LMS/RLS adaptation algorithms implemented in a digital signal processing (DSP) chip. These methods are well known from telephone communication. One drawback associated with this method is the need for a powerful DSP chip that incorporates floating point operations. Such echo-cancellation chips are commercially available.

Non-linearity cancellation methods are also known. It is recognized that non-linearity may be introduced into the received signals due to the non-linear response of either the transmitter or the receiver amplifiers. In one example of receiver non-linearity cancellation, an initial estimate of the linear component of receiver signal may be determined based at least in part on the known transmitted signal from the transmitter. After the linear component is subtracted from the receiver signal, the residual non-linear component may be estimated. Estimates of the receiver non-linear component may require the use of a Taylor series expansion (using multiple terms) to model the non-linear receiver response. An adaptive transmitter non-linearity cancellation method may include sourcing the pre-amplified transmitted signal into an adaptive processor to produce of a weighted sum of nonlinear transformations of the original transmitter data. The output of the adaptive processor may be added to the transmitted signal to cancel out the non-linearities induced by the transmitter amplifier. It may be recognized that both techniques are computationally expensive and may require the use of high-end DSP processing chips.

The full duplex SI cancellation problem is much more complex in underwater acoustic communication than in RF communication. Non-limiting examples of such difficulties that may arise in underwater acoustic full duplex communications may include multipath fading, severe bandwidth limitation, non-Gaussian noise, transmitter and/or receiver response non-linearities, and large propagation time spread and time variability in the multipath. At present, there are no known practical full duplex solutions for underwater acoustic communication. However, it is most likely that an acoustic solution may require a combination or combinations of the methods 2-4 as disclosed above. These methods are not specific to acoustic or RF propagation and include basically accepted algorithms that may include larger time spread and variability of the time response to address the differences between acoustic underwater communication and RF communications. However, specific and innovative solutions for full duplex underwater communication may be found only in the first group of methods disclosed above.

Disclosed herein are proposed solutions for full-duplex SI cancellation in underwater acoustic communications that at least in part address the problem in the wave-domain at the physical OSI level. Aspects for separating the received signal from the simultaneously transmitted signal are proposed based on the geometry of the transducer array in the near acoustic field and in the input circuits of the receiving array. It may be recognized that additional methods disclosed above referencing methods 2-4, above, may be included in the solutions disclosed below.

1. Separation by Creating a Silent Zone in the Near Field of a Transmitter Array and Mounting the Receiver in the Silent Zone In some aspects, techniques to address full-duplex SI cancellation may exploit one or more acoustically silent zones near a transmitting array. When a transmitter array has more than one transducer in the near field, an acoustic node having a sound pressure close to zero in a whole working frequency band may be created.

FIG. 1 depicts one example of a system 100 having multiple transmitters 120$a,b$ and receivers 115 that may result in the receivers 115 being positioned at one or more acoustic nodes of the transmitters 120$a,b$. Each of the two transmitters 120$a,b$ may transmit a waveform within a working frequency band in which a first transmitter 120$a$ transmits the waveform at a first polarity and the second transmitter 120$b$ transmits the waveform at a second polarity. In some examples, the first polarity may be opposite to (that is, about 180° out of phase with) the second polarity. The two transmitters 120$a,b$ may be disposed along the axis of the radiation pattern maximum 123 by a predetermined distance 125. In some examples, the predetermined distance 125 may be approximately equal to the half wavelength of a central frequency of the working frequency band. In one example, a plurality of receivers 115 may be disposed in a generally planar receiver array 110 about half way between the first transmitter 120$a$ and the second transmitter 120$b$, the receiver array 110 being disposed along, and perpendicular to, the axis of the radiation pattern maximum 123. In some examples, the receiver array 110 may be disposed at a distance about half-way between the first transmitter 120$a$ and the second transmitter 120$b$.

It may be recognized that such a disposition of the receiver array 110 may result in each of the plurality of receivers 115 being located at an area in which the wave interference will give a sound pressure close to zero (a silent plane). Thus, if the receiver array 110 is mounted in this silent plane, it will not receive any signals transmitted by the pair of transmitters 120$a,b$. Because the SI compensation is dependent only on the sound wave mechanics, additional compensation for the non-linearity of the transmitters 120$a$, $b$, receivers 115, or propagation media (water) may be unnecessary.

Although the receiver array 110 in FIG. 1 is disclosed as a rectangular array, it may be understood that any receiver array configuration is possible. In some non-limiting examples, a receiver array 110 may be composed of multiple receivers 115. Alternatively, only one receiver 115 disposed in the middle between transmitters 120$a,b$ may be used. The receiver array 110 may be a rectangular array, a square array, a circular array, or have any other geometry as may permit the functions disclosed herein.

It may be appreciated that this aspect of acoustic SI cancellation may be difficult to achieve in practice for applications in wireless or RF communication with a frequency less than 1 GHz because of the large antenna dimensions required for a transmitter in these frequency domains. Because of the smaller frequencies required for acoustic transmitters, it may be easier and practical to space the acoustic transmitters about a few centimeters apart in order to realize geometrically-based cancellation techniques.

In some examples of the system 100 depicted in FIG. 1, the transmitters and the receivers may have similar radiation response patterns. Thus, in some examples, the transmitters and receivers may have a cardioid response pattern. In some alternative examples, the transmitters and receivers may be omnidirectional. In addition to the geometric-based SI cancellation methods as depicted in FIG. 1, additional cancellation may be afforded by a system in which the radiation response pattern of the transmitters may differ from that of the receivers. Thus, the receivers may have a maximum sensitivity in a direction in which the transmitter radiation energy is minimized. In order to create this directional-based separation of the receivers and transmitters, a system depicted in FIG. 2 may be added.

Figure 2:
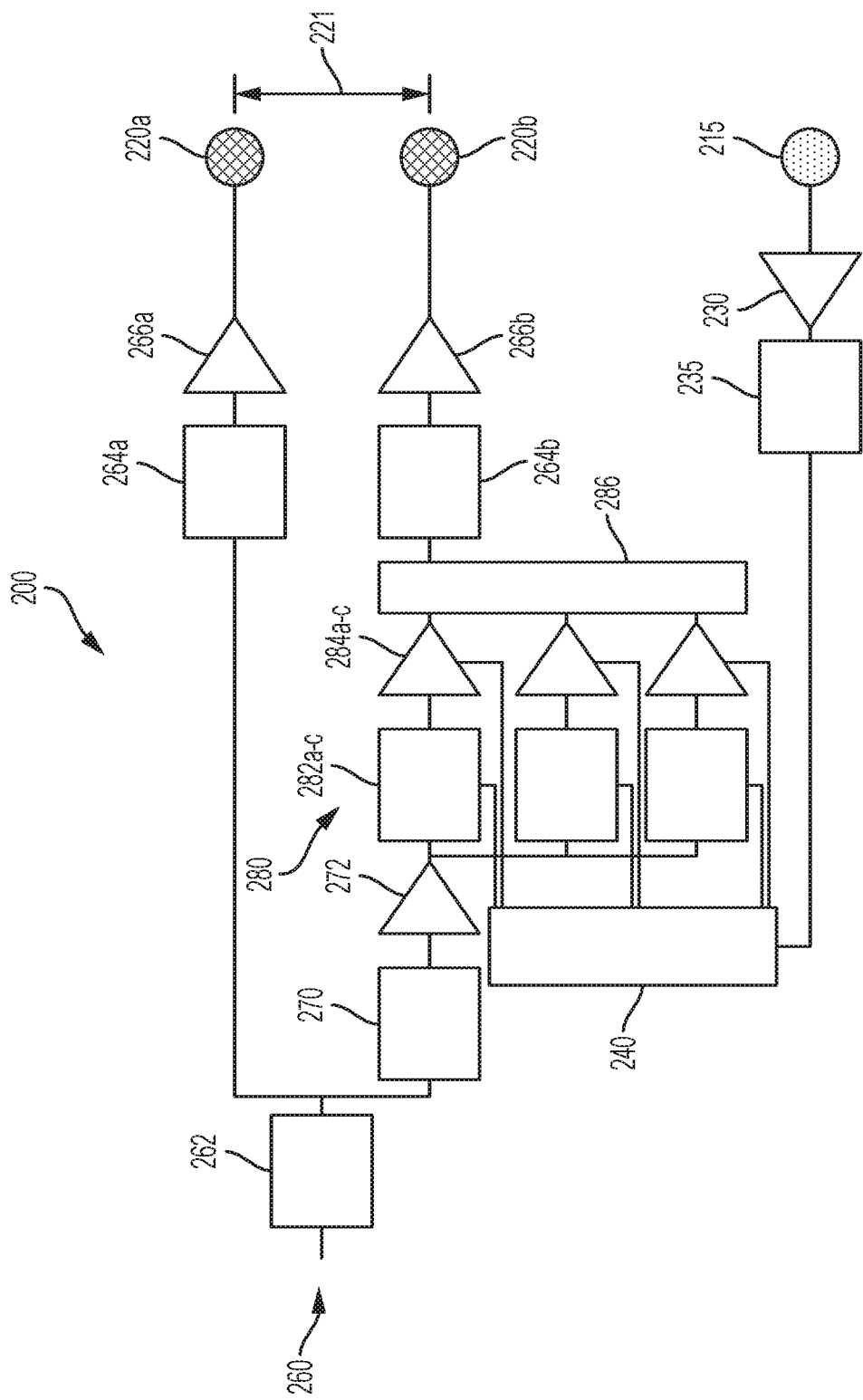
FIG. 2 depicts a schematic of an adaptive system with a cardioid radiation pattern and omnidirectional receiver according to at least one aspect of the present disclosure.

FIG. 2 depicts a schematic of a system 200 for adaptive compensation of a single receiver for acoustic transmissions from a pair of transmitters. The system 200 depicted in FIG. 2 includes a pair of transmitters 220a,b that transmit with a cardioid radiation pattern. System 200 also includes an omnidirectional receiver 215. In some example, a cardioid transmission pattern may be required when the transmitter is placed on the ocean bottom and transmits to the upper hemisphere. This directivity pattern partly suppresses the reflection from the bottom surface. The same directivity may similarly be used for transmissions from the surface to the deep water, in which surface reflections may be partly suppressed.

In general, the system 200 depicted in FIG. 2 employs an adaptive filter to cause the output of a first transmitter 220a and a second transmitter 220b to mutually cancel at a receiver 215. The transmitters' 220a,b signal cancellation at the receiver 215 may be effected by matching the amplitudes of the signals emitted by the two transmitters 220a,b at the receiver 215 and matching the propagation time delays (phase) of the transmitted signals at the receiver 215. The signal transmitted by the first transmitter 220a in a direction to hydrophone receiver 215 will have the opposite sign and the same delay as the signal propagating from the second transmitter 220b in the same direction. If these signals have the same amplitude and phase at the receiver 215, they will cancel each other. The adaptive filter is designed to equalize the amplitudes and phases of the acoustic signal received at receiver 215 and correct some possible nonlinear distortions. If the amplitudes of these signals are sufficiently equal and opposite to each other then the nonlinear distortions may be subtracted.

As depicted in FIG. 2, two transmitters 220a,b are separated in space by a distance 221 approximately equal to the quarter of the wavelength of the central frequency of the working frequency band. The hydrophone receiver 215 is disposed co-axial with the centers of the transmitters 220a,b and disposed equidistant from them. The signal from hydrophone receiver 215 is amplified at a receiver amplifier 230 and converted to a digital signal at an analog-digital converter 235. The digital signal from the analog-digital converter 235 is received by an adaptive processor 240. In some aspects, the adaptive processor 240 employs a stochastic gradient method to calculate delays and amplitudes that may be used by a finite impulse response (FIR) filter 280. It may be understood that alternative adaptive methods may be used to calculate the coefficients for the FIR filter 280.

At the transmitter end of the system 200, a data stream signal 260 is used as input to a digital modulator 262. One output of the digital modulator 262 is directed to a first digital-analog converter 264a. The analog signal output of the first digital-analog converter 264a serves as input signal to a first transmitter amplifier 266a which, in turn, sources an input to the first transmitter 220a. A second output of the first digital-analog converter 264a is directed to a fixed time delay circuit 270 which in turn provides an input circuit to a digital sense inverter 272. The fixed delay circuit 270 is designed to induce a delay in the inverted transmission signal that is about equal to the signal propagation delay time between the first 220a and the receiver 215. The negative, delayed, digital copy of the transmitted signal, sourced by the digital sense inverter 272, proceeds to the input of the FIR filter 280. The FIR filter 280 is composed of multiple branches of controllable delay circuits 282a-c and controllable gain circuits 284a-c. The outputs of the multiple branches of controllable delay circuits 282a-c and controllable gain circuits 284a-c are added together at a summer 286. The signal produced by the summer 286 is then converted to an analog signal (at a second digital-analog converter 266b) and then supplied to a second transmitter amplifier 266b. The signal output of the second transmitter amplifier 266b is then, in turn, sourced as an input to the second transmitter 220b. Although only three branches of controllable delay circuits 282a-c and controllable gain circuits 284a-c are depicted in FIG. 2, the number of branches of controllable delay circuits and controllable gain circuits may be any finite number and may depend solely on the computational and electronic resources available for the filter and the computational resources of the adaptive processor 240. For example, the number of branches of controllable delay circuits and controllable gain circuits may include two branches, three branches, four branches, five branches, or more.

The parameters controlling the controllable delay circuits 282a-c and controllable gain circuits 284a-c of the FIR filter 280 are derived from the adaptive processor 240. Upon convergence of the parameters derived from the adaptive processor 240, the input to the receiver 215 is fully compensated to the transmitted signal in the near field of the transmitters 220a,b. For an adaptive processor 240 having limited time spread, a least mean squares (LMS) or a recursive least squares (RLS) algorithm may be used to generate the required coefficients of the FIR filter 280. Upon convergence of the parameters, the FIR filter 280 may result in the transmitter-induced interference signal at the receiver 215 to be reduced to near zero. The system 200 depicted in FIG. 2 is designed to equalize delays and correct small linear distortions between the transmitters 220a,b and the receiver 215. The adaptive cancellation of system 200 may be limited to a small range of delays close to the output signal delay between the transmitters 220a,b. However, the FIR filter 280 may not affect the general radiation pattern of the transmitters 220a,b.

2. Separation in the Receiving Hydrophone Array

Figure 3:
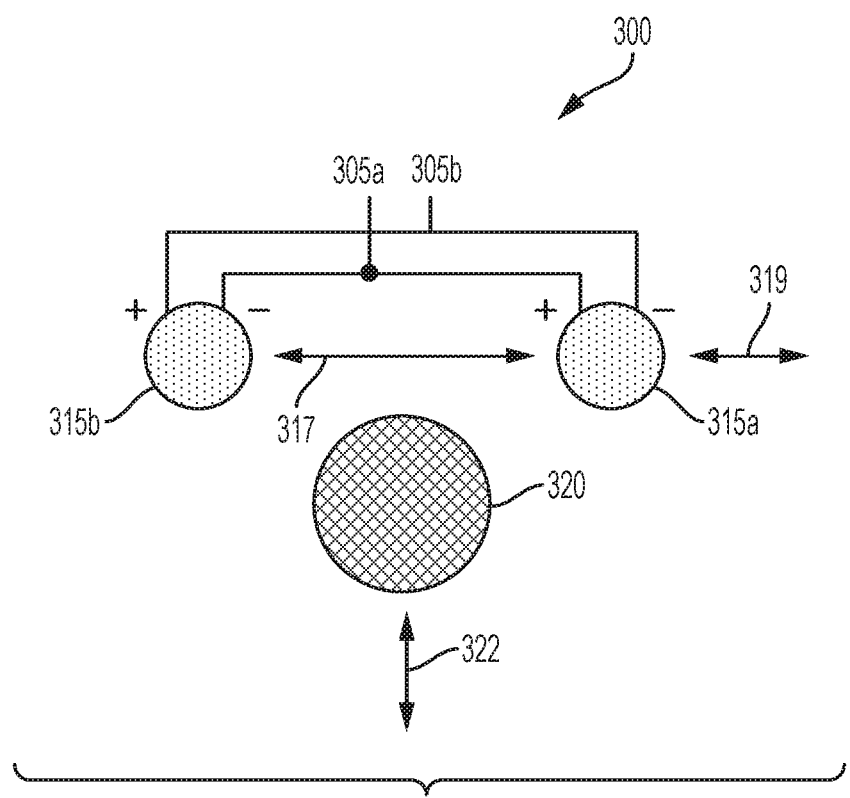
FIG. 3 depicts a diagram of a pair of antiparallel connected receivers having noise immunity from a centrally located transmitter according to at least one aspect of the present disclosure.

FIG. 3 depicts another system 300 in which two identical, symmetrically mounted hydrophones receivers 315a,b are connected together in opposing polarity. Typically, the electrical response non-linearity of a hydrophone receiver (for example, 315a,b) is small. However, the non-linearity may be comparable in magnitude to the SI signal requiring cancellation that is received from the transmitter. In some examples, the electrical non-linearity of matched receivers 315a,b may be about equal. In one aspect of a system 300 composed of a pair of receivers and a single transmitter, two hydrophone receivers 315a,b, connect in opposing polarity, may be disposed equidistant from a transmitter 320 along a receiver axis 319. Thus, a first paired output 305a may be connected to the positive output of the first receiver 315a and also to the negative output of the second receiver 315a. Similarly, a second paired output 305b may be connected to the negative output of the first receiver 315a and also to the positive output of the second receiver 315a The distance 317 between the receivers 315a,b may be about half the wavelength of the central frequency of the working frequency band of the transmitter 320. In the near field of the transmitter 320, the transmitted signal will be essentially symmetric along the transmission axis 322. It may be recognized that the transmission axis 322 may be orthogonal to the receiver axis 319. Thus, the transmitted signal detected by the receivers 315a,b disposed equidistant and at the one quarter wavelength from the transmitter will be nearly equal. As a result of this geometry, the transmitter signals detected by the receivers 315a,b will essentially be cancelled due to the opposing connection of the receivers 3125a,b. However, a signal originating from a far sound source at an angle not orthogonal to the receiver axis 319 will be detected because of the asymmetric reception of the signal. It may be understood that the maximum reception sensitivity off non-orthogonal transmitted signals will be in the direction of the receiver axis 319.

Figure 4:
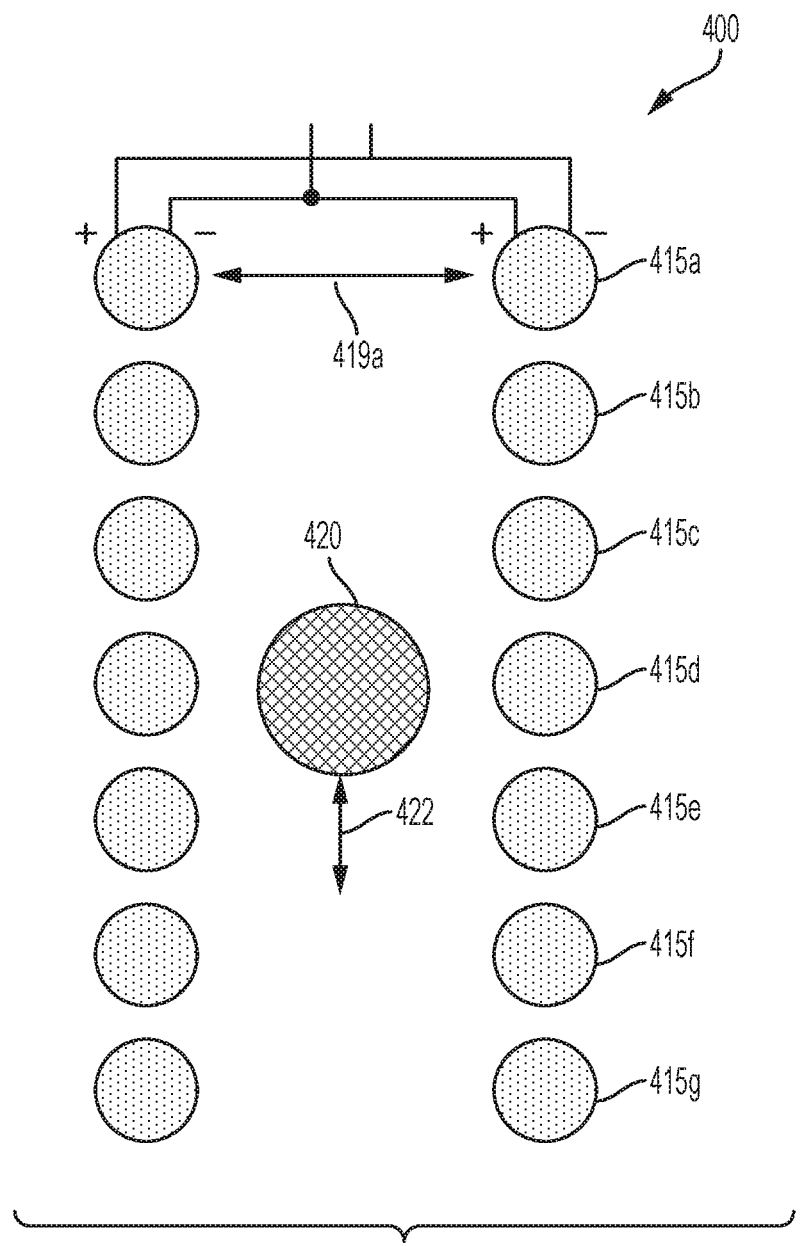
FIG. 4 depicts a plan view of multiple pairs of antiparallel connected receivers having noise immunity from a centrally located transmitter according to at least one aspect of the present disclosure.

Although FIG. 3 depicts a system 300 composed of two receivers 315a,b connected in opposing polarity, in some aspects, an array may be composed of a plurality of identical hydrophone pairs connected in opposing polarity. FIG. 4 depicts a receiver array 400 composed of a plurality of hydrophone receiver pairs 415a-g disposed about a single transmitter 420. In some examples, the receiver array 400 may be a planar array of receiver pairs 415a-g and the transmitter 420 is co-planar with the receiver array 400. It may be recognized that each receiver pair 415a-g depicted in FIG. 4 has a receiver axis (for example 419a) equivalent to receiver axis 319 in FIG. 3, and that the receiver axes will be mutually parallel. It may be additionally understood that the receiver axis (for example 419a) of each receiver pair 415a-g in FIG. 4 is orthogonal to a transmission axis 422 equivalent to transmission axis 322 in FIG. 3.

Figure 5:
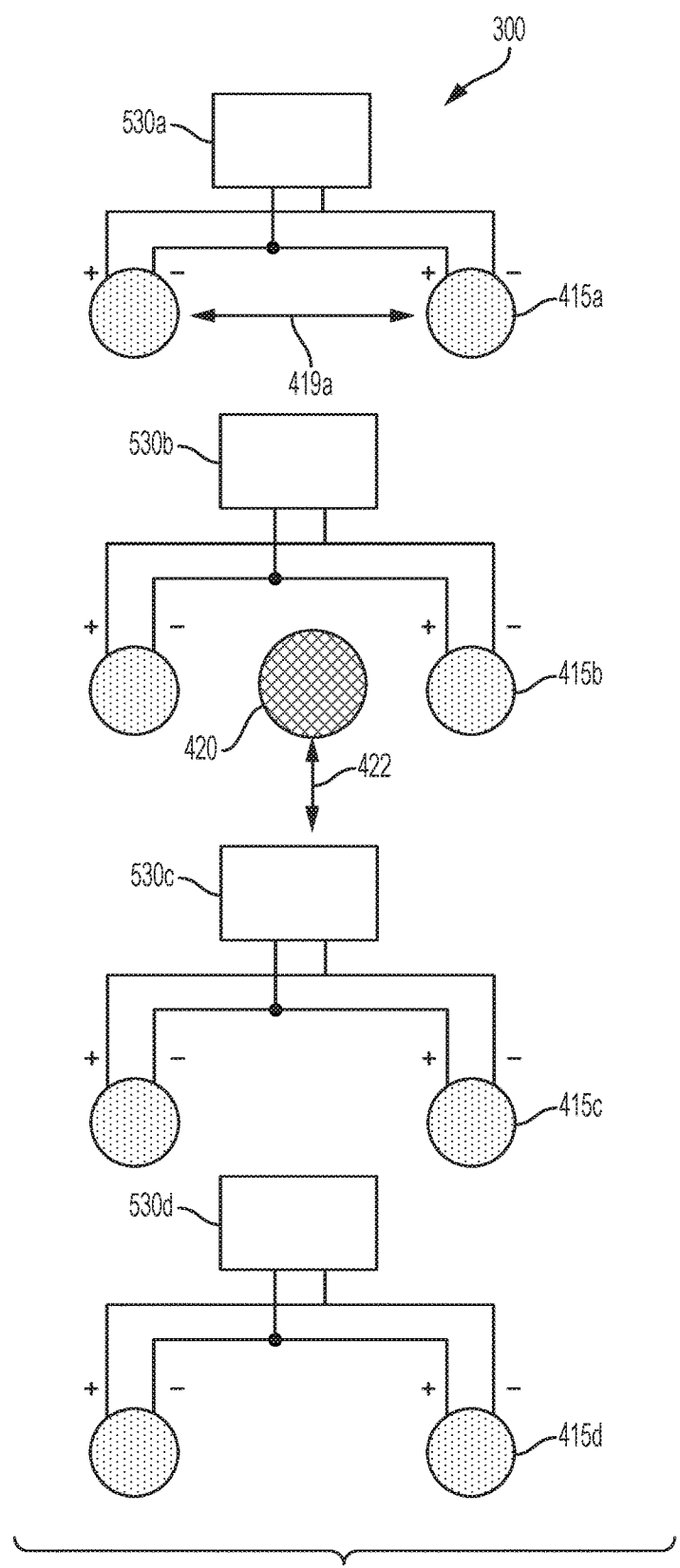
FIG. 5 depicts a plan view of multiple pairs of antiparallel connected receivers as depicted in FIG. 4 including electrical connections of the outputs of each pair according to at least one aspect of the present disclosure.

FIG. 5 depicts an example 500 of the electrical connections of some of the pairs of receivers 415a-d as depicted in FIG. 4. As disclosed above with respect to FIG. 3, the receivers in each pair of receivers 415a-d are connected together in opposing polarity. Thus, a first paired output of each pair of receivers 415a-d may be connected to the positive output of a first member of the pair of receivers and also to the negative output of a second member of the pair of receivers. Similarly, a second paired output of each pair of receivers 415a-d may be connected to the negative output of the first member of the pair of receivers and also to the positive output of the second member of the pair of receivers.

The first paired output and second paired output of each pair of receivers 415a-d may serve as electrical inputs to a conditioning block of electronics 530a-d. In some examples, the conditioning blocks of electronics 530a-d may be individual circuits. In some alternative examples, the conditioning blocks of electronics 530a-d may represent multiple receiver signal inputs for a single electronic system. Each of the multiple receiver signal inputs may be configured to receive the first paired output and the second paired output of one of the pairs of receivers 415a-d. In some examples, the conditioning blocks of electronics may include one or more first stage pre-amplifiers configured to receive the first paired output and the second paired output of one of the pairs of receivers 415a-d. In some examples, the outputs of the pre-amplifiers may source signals to a differential amplifier for each receiver pair. In an aspect of the single electronic system, the pre-amplified output from each pair of receivers may be phase adjusted for pattern directivity control.

Figure 6:
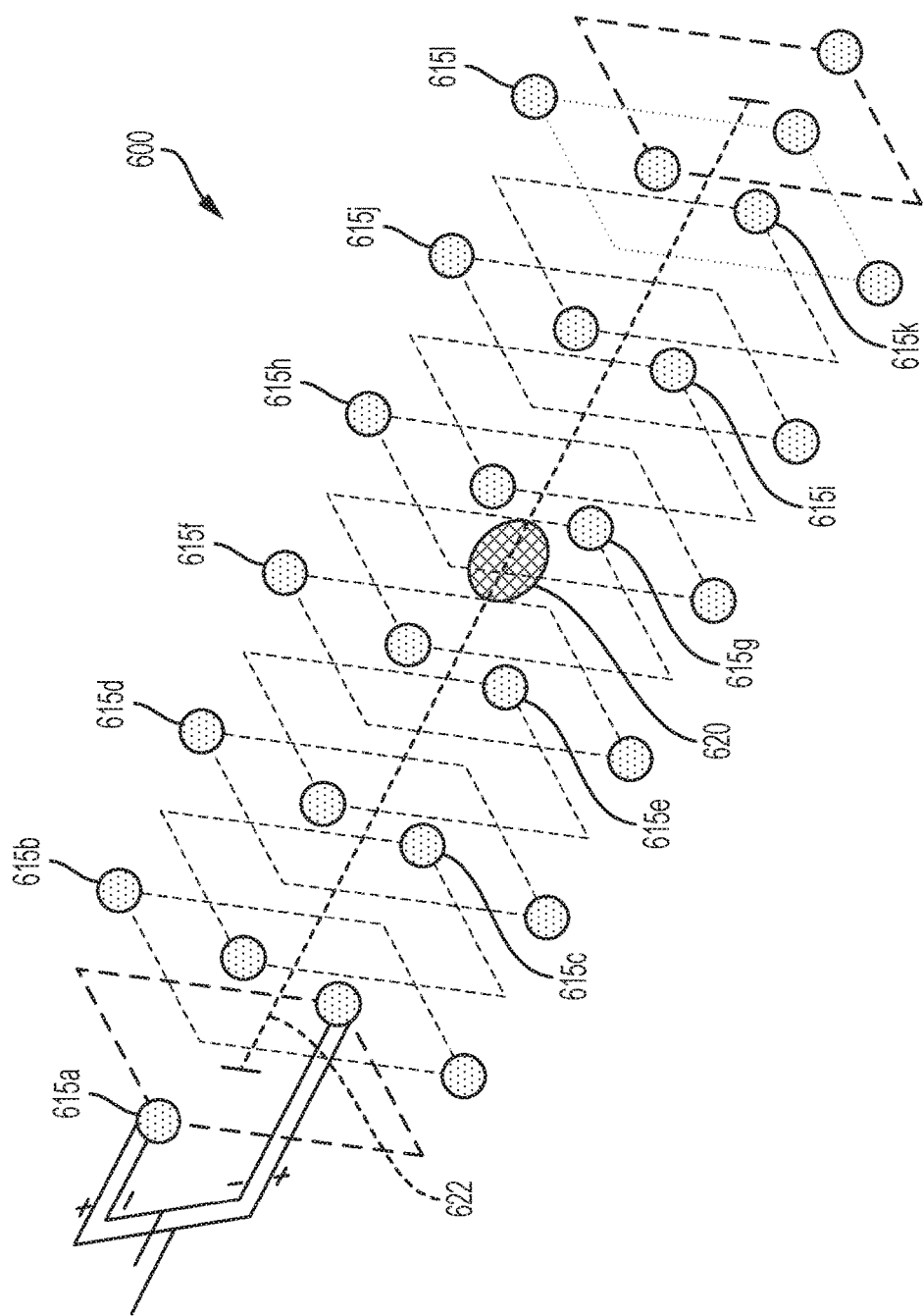
FIG. 6 depicts a perspective view of a diagram of multiple pairs of antiparallel connected receivers disposed in a quadrature configuration according to at least one aspect of the present disclosure.

As depicted in FIGS. 4 and 5, the receiver pairs 415a-g (415a-d in FIG. 5) may be disposed in a planar array 400. However, any far field signal received along the transmission axis 422 will be cancelled along with the near field transmission of transmitter 420. In order to properly receive such far field transmissions, one or more pairs of transmitters may be disposed in quadrature to the planar array. An array of alternating quadrature pairs of transmitters 600 is depicted in FIG. 6. As it can be observed in FIG. 6, alternating pairs of receivers may be disposed in quadrature with respect to each other. Thus, receiver pairs 615a, 615c, 615e, 615g, 615i, and 615k may be disposed on a first planar receiver subarray and receiver pairs 615b, 615d, 615f, 615h, 615j, and 615l may be disposed on a second planar receiver subarray in which the first planar subarray is orthogonal to the second planar subarray. Further, it may be recognized in FIG. 6 that the first planar receiver subarray and the second planar receiver subarray are coaxial about a longitudinal axis that equally divides each of the first planar receiver subarray and the second planar receiver subarray. This longitudinal axis is coaxial with the transmission axis 622 of transmitter 620.

It may be understood that the receiver pairs may also be rotated about the transmission axis at arbitrary angles to cover all possible receiving directions. As one additional example, FIG. 7 depicts a system 700 in which the multiple receiver pairs 715a-n are disposed in a helical arrangement about the transmission axis 722 of the transmitter 720.

Figure 7:
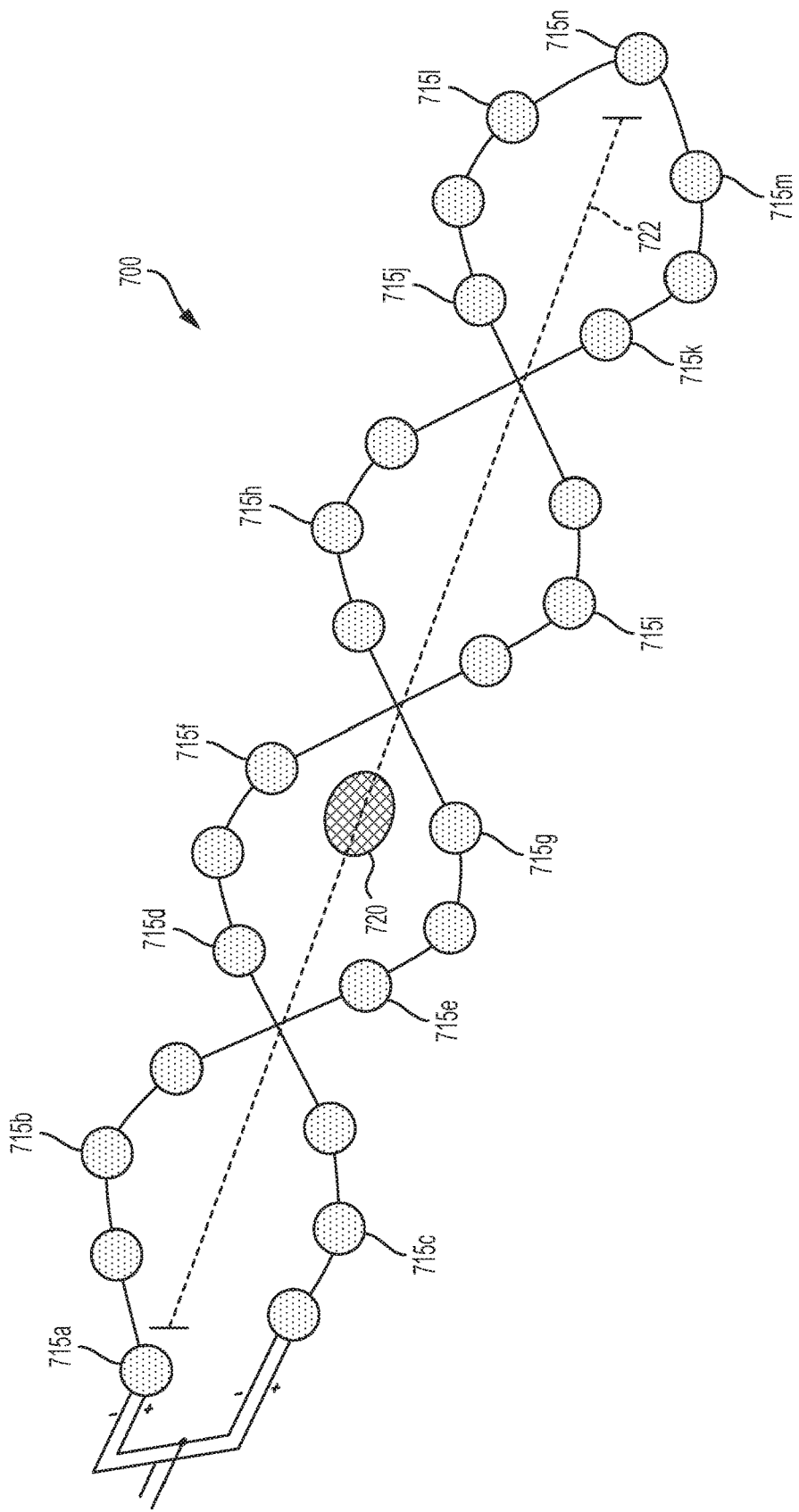
FIG. 7 depicts a perspective view of a diagram of multiple pairs of antiparallel connected receivers having noise immunity from a centrally located transmitter disposed in a helical configuration according to at least one aspect of the present disclosure.

Although not shown in FIGS. 6 and 7, each of the pairs of receivers may be connected in opposing polarity as disclosed above with respect to FIGS. 3-5. Further, the first paired output and the second paired output of each pair of receivers may provide input signals to a conditioning block of electronics similar to that disclosed above in FIG. 5 (see 530a-d).

it may be recognized that some difficulties may exits in the use of multiple receivers to cancel near field transmissions for full duplex communications. In order for a pair of receivers connected in opposing polarity to cancel the near field transmissions of a transmitter, the receivers must be precisely placed (equidistant from the transmitter) about the transmission axis. Additionally, the receivers should have identical electrical responses across all useful frequencies and amplitudes. The use of a vector sensor may be an alternative approach to the use of paired discrete receivers. Applications for a vector sensor may include underwater target localization and SONAR applications.

A vector sensor is capable of measuring the particle velocity, which is related to the gradient of sound pressure and local acoustic impedance. Vector sensors may rely upon one of two technical methods: a pressure-velocity method, and a pressure-pressure method. In some examples of the pressure-velocity method, the particle velocity may be measured by time integration of the output of three orthogonal accelerometers. Alternatively, the particle velocity may be measured directly, such as through the use of an anemometer or a double hot-wire sensor. In some examples of the pressure-pressure method, the particle velocity may be calculated using finite difference approximation of the spatial derivative of the sound-field as detected by two or more spaced hydrophone receivers. In this example, the separation between the multiple receivers may be smaller than the acoustical wavelength.

Figure 8:
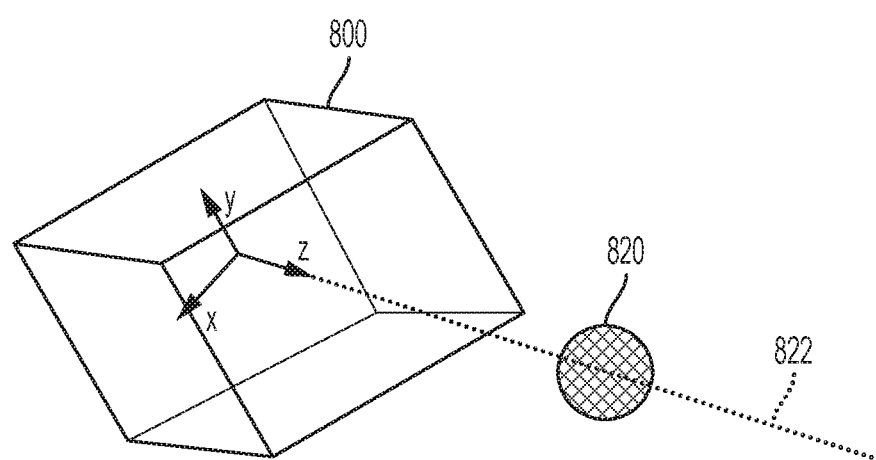
FIG. 8 depicts a diagram of a vector sensor receiver according to at least one aspect of the present disclosure.

FIG. 8 depicts schematically the use of a vector sensor 800 in order to cancel near field transmissions by a transmitter 820. When a vector sensor 800 is oriented with its z-axis (Z) along the direction of transmission axis 822 of a local transmitter 820, then the output from the other two orthogonal axes (X-axis and Y-axis) will be close to zero for an axially symmetric transmission by the transmitter 820. These two outputs (X and Y) can be used for the signal reception during full power transmitting from the local transmitter 820. Any combination of the acoustic vector sensors 800 pointed along the Z axis to the direction of a wave-front propagation (transmission axis 822) can be used to form an acoustic array. It may be recognized that a vector sensor 800 may be used as a receiver of the acoustic output of a transmitter. It may also be recognized that an underwater acoustic communication system may include one or more vector sensors in which each vector sensor is oriented so that the z-axis is coaxial with the transmission axis of the local transmitter. In yet another non-limiting example, an underwater acoustic communication system may include one or more vector sensors along with one or more hydrophone receivers or pairs of receivers.

It may be recognized that an adaptive compensation circuit similar to that depicted in FIG. 2 may be added to a system composed of a single transmitter and two or multiple receivers. In one example, a system may be composed of two hydrophone receivers having a cardioid response pattern. In a system having multiple hydrophone receivers, the receivers may be disposed in an array in which the zero of the directivity pattern of the receivers may be directed towards the transmitter. Advantages of this configuration may include a reduction of transmitter cost and make radiation patterns omnidirectional. An example of such an adaptive compensation circuit is depicted in FIG. 9.

Figure 9:
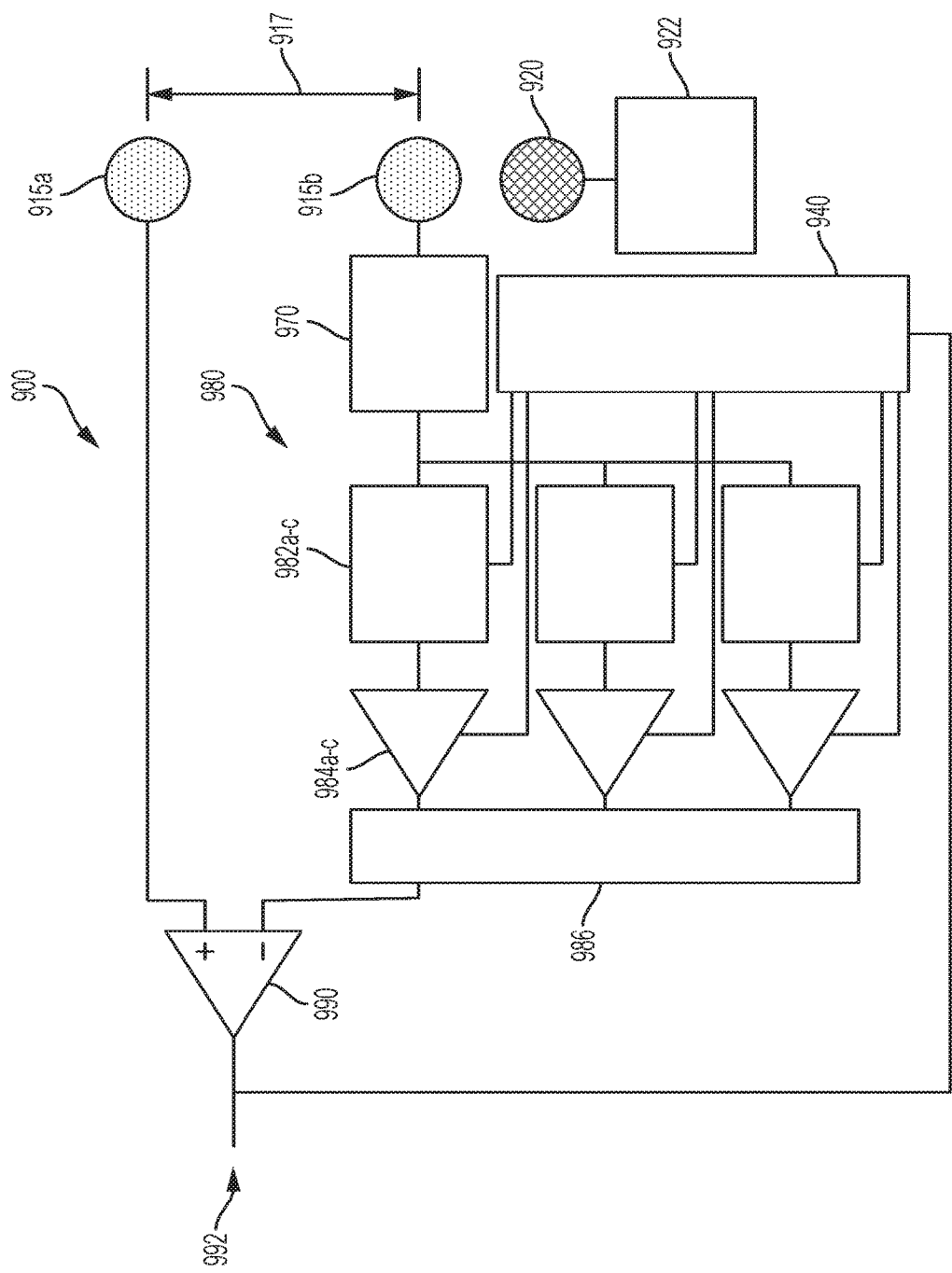
FIG. 9 depicts a schematic of an adaptive system having a cardioid receiving pattern and an omnidirectional transmitter according to at least one aspect of the present disclosure.

As depicted in FIG. 9, two receivers 915a,b are separated in space by a distance 917 approximately equal to the quarter of the wavelength of the central frequency of the working frequency band. The transmitter 920 is disposed co-axial with the centers of the receivers 915a,b. The output of the transmitter 920 is controlled by transmitter conditioning circuit 922. The output from the second hydrophone receiver 915b is delayed by a fixed time delay circuit 970 to account for the propagation time between the first receiver 915a and the second receiver 915b. The output of the fixed time delay circuit 970 is used as an input to an FIR filter 980 which is composed of multiple branches of controllable delay circuits 982a-c and controllable gain circuits 984a-c. Although only three branches of controllable delay circuits 982a-c and controllable gain circuits 984a-c are depicted in FIG. 9, the number of branches of controllable delay circuits and controllable gain circuits may be any finite number and may depend solely on the electronic resources available for the filter and the computational resources of the adaptive processor 940. For example, the number of branches of controllable delay circuits and controllable gain circuits may include two branches, three branches, four branches, five branches, or more.

The outputs of the multiple branches of controllable delay circuits 982a-c and controllable gain circuits 984a-c are added together at a summer 986. The gain and delay parameters of the FIR filter 980 are determined by an adaptive processor 940. The output signal from the summer 986 is subtracted from the input signal of receiver 915a at differential amplifier 990. The final output signal 992 from the differential amplifier 990 is fed back to control the adaptive processor 920. If the input signals to the receivers 915a,b represent output signals from the transmitter 920, the delay between the signal from the first receiver 915a and the second receiver 915b (after the application of the fixed delay at circuit 970) will be about zero. As a result, the feedback signal (992) to the adaptive processor 940 from the differential amplifier 990 will cause the FIR filter 980 to introduce no additional delay or gain to the time delayed signal from the second receiver 915b. As a result, the differential amplifier 990 will subtract essentially identical signals received from the receivers 915a,b leading to the cancellation of the transmitter 920 sourced signal. In some examples, the adaptive processor 940 having limited time spread may use a least mean squares (LMS) or a recursive least squares (RLS) algorithm to make feedback signal 992 as close to zero as possible. In some aspects, the adaptive processor 940 may be designed to equalize the amplitude and the time delay between the signals received by the receivers 915a,b and to correct for small linear distortions.

It may be recognized that the system 900 depicted in FIG. 9 relies upon the analog signals received by the receivers 915a,b. As a result, the adaptive filter 980 may be composed of primarily analogue components. An advantage of an analog adaptive filter 980 is the ability to correct for small non-linearities between the receivers 915a,b. In some examples, the controllable delay circuits 982a-c may be realized by the use of a bucket brigade delay line or linear delay line. In some alternative examples, the gain control circuits 984a-c can be realized through the use of a switching resistor divider. Although the adaptive filter 980 as disclosed above and in FIG. 9 may be composed of analog components, it may be recognized that any one or more components of the adaptive filter 980 may include digital circuit components.

While several aspects have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various aspects of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the aspects disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A communication system for underwater acoustic full-duplex communication, the communication system comprising:
 a transmitter comprising a transmitter array, wherein the transmitter array comprises a first transmitter and a second transmitter, and wherein the first transmitter and the second transmitter are:
  positioned along an axis of a radiation pattern maximum;
  separated by a distance approximately equal to a half wavelength of a central frequency of the working frequency band; and
  configured to transmit waveforms with opposite polarity that interfere to produce near-zero sound pressure in a silent plane perpendicular to the axis; and
 a receiver comprising a receiver array, wherein the receiver array comprises at least one receiver positioned in the silent plane.

2. The communication system of claim 1, wherein the first transmitter and the second transmitter are positioned in a near field of the transmitter.

3. The communication system of claim 1, wherein the receiver array comprises one receiver positioned an equal distance between the first transmitter and the second transmitter.

4. The communication system of claim 1, wherein the receiver array comprises a plurality of receivers positioned in the silent plane.

5. A communication system for underwater acoustic full-duplex communication, the communication system comprising:
 a first transmitter configured to transmit a first signal with a first polarity;
 a second transmitter configured to transmit a second signal with a second polarity, wherein the second polarity is opposite the first polarity, and wherein the first transmitter and the second transmitter are:
  positioned along an axis extending through a center of the first transmitter and a center of the second transmitter; and
  separated by a distance approximately equal to a quarter wavelength of a central frequency of the working frequency band;
 a receiver positioned on the axis; and
 an adaptive processor in communication with the first transmitter, the second transmitter, and the receiver, wherein the adaptive processor is configured to:
  receive an output signal from the receiver; and
  apply a stochastic gradient adaptive filter to the output signal to:

equalize a first amplitude of the first signal with a second amplitude of the second signal; and
equalize a first delay of the first signal with a second delay of the second signal.

6. The communication system of claim 5, wherein the stochastic gradient adaptive filter comprises a least mean squares filter.

7. The communication system of claim 6, wherein applying the least mean squares filter makes any residual signal in a near field of the receiver near-zero.

8. The communication system of claim 5, wherein the stochastic gradient adaptive filter comprises a recursive least squares filter.

9. The communication system of claim 8, wherein applying the recursive least squares filter makes any residual signal in a near field of the receiver near-zero.

10. A communication system for underwater acoustic full-duplex communication, the communication system comprising:
a transmitter; and
a first receiver set comprising a first receiver and a second receiver, wherein the first receiver and the second receiver are:
separated by a distance approximately equal to a half wavelength of a central frequency of the working frequency band;
symmetrically positioned along a first axis an equal distance from the transmitter;
connected in parallel in an opposite polarity; and
configured to:
output a near-zero signal in response to a signal transmitted by the transmitter; and
output a non-zero signal in response to any signal arriving from a direction different than orthogonal to the first axis.

11. The communication system of claim 10, further comprising:
a second receiver set comprising a third receiver and a fourth receiver, wherein the third receiver and the fourth receiver are:
separated by the distance approximately equal to the half wavelength of the central frequency of the working frequency band;
symmetrically positioned along a second axis an equal distance from the transmitter, wherein the second axis is perpendicular to the first axis;
connected in parallel in an opposite polarity; and
configured to:
output a near-zero signal in response to the signal transmitted by the transmitter; and
output a non-zero signal in response to any signal arriving from a direction different than orthogonal to the second axis.

12. The communication system of claim 11, further comprising a receiver comprising a receiver array, wherein the receiver array comprises a plurality of receiver sets, and wherein the plurality of receiver sets include the first receiver set and the second receiver set.

13. A communication system for underwater acoustic full-duplex communication, the communication system comprising:
a transmitter; and
a receiver comprising an array of receivers, wherein the array of receivers comprises at least one vector sensor receiver, wherein each vector sensor receiver comprises an X-axis, a Y axis, and a Z-axis, and wherein the Z-axis of the at least one vector sensor receiver is positioned in the direction of a signal transmitted by the transmitter to output a near-zero signal in the X-axis direction and the Y-axis direction.

14. A communication system for underwater acoustic full-duplex communication, the communication system comprising:
a first receiver and a second receiver, wherein the first receiver and the second receiver are:
positioned along an axis extending through a center of the first receiver and a center of the second receiver; and
separated by a distance approximately equal to a quarter wavelength of a central frequency of the working frequency band;
a transmitter positioned on the axis, wherein the first receiver is configured to receive a first signal from the transmitter, and wherein the second receiver is configured to receive a second signal from the transmitter; and
an adaptive processor in communication with the first receiver and the second receiver, wherein the adaptive processor is configured to:
receive an output signal from the second receiver; and
apply a stochastic gradient adaptive filter to the output signal to:
equalize a second amplitude associated the second signal received by the second receiver with a first amplitude associated with the first signal received by the first receiver; and
equalize a second delay associated with the second signal received by the second receiver with a first delay associated with the first signal received by the first receiver.

15. The communication system of claim 14, wherein the stochastic gradient adaptive filter comprises at least one of a least mean squares filter or a recursive least squares filter to make any residual signal in a near field of the first receiver and the second receiver near-zero.

16. A transmitter for underwater acoustic full-duplex communication, the transmitter comprising:
a transmitter array comprising a first transmitter and a second transmitter, wherein the first transmitter and the second transmitter are:
positioned along an axis of a radiation pattern maximum;
separated by a distance approximately equal to a half wavelength of a central frequency of the working frequency band; and
configured to transmit waveforms with opposite polarity to at least one receiver positioned in a plane perpendicular to the axis such that the waveforms interfere to produce near-zero sound pressure in the plane.

17. A system for underwater acoustic full-duplex communication, the system comprising:
an adaptive processor configured to:
receive an output signal from a receiver positioned on an axis extending through a center of a first transmitter and a center of a second transmitter positioned along the axis, wherein the first transmitter and the second transmitter are separated by a distance approximately equal to a quarter wavelength of a central frequency of the working frequency band; and
apply a stochastic gradient adaptive filter to the output signal to:

equalize a first amplitude of a first signal having a first polarity transmitted by the first transmitter with a second amplitude of a second signal having a second polarity opposite the first polarity transmitted by the second transmitter; and equalize a first delay of the first signal with a second delay of the second signal.

18. A receiver for underwater acoustic full-duplex communication, the receiver comprising: a receiver array, comprising:

a first receiver set comprising a first receiver and a second receiver, wherein the first receiver and the second receiver are:

separated by a distance approximately equal to a half wavelength of a central frequency of the working frequency band;

symmetrically positioned along a first axis an equal distance from a transmitter;

connected in parallel in an opposite polarity; and configured to:

output a near-zero signal in response to a signal transmitted by the transmitter; and output a non-zero signal in response to any signal arriving from a direction different than orthogonal to the first axis; and a second receiver set comprising a third receiver and a fourth receiver, wherein the third receiver and the fourth receiver are:

separated by the distance approximately equal to the half wavelength of the central frequency of the working frequency band;

symmetrically positioned along a second axis an equal distance from the transmitter, wherein the second axis is perpendicular to the first axis;

connected in parallel in an opposite polarity; and configured to:

output a near-zero signal in response to the signal transmitted by the transmitter; and output a non-zero signal in response to any signal arriving from a direction different than orthogonal to the second axis.

19. A receiver for underwater acoustic full-duplex communication, the receiver comprising:

an array of receivers comprising at least one vector sensor receiver, wherein each vector sensor receiver comprises an X-axis, a Y-axis, and a Z-axis, and wherein the Z-axis of the at least one vector sensor receiver is positioned in the direction of a signal transmitted by a transmitter to output a near-zero signal in the X-axis direction and the Y-axis direction.

20. A system for underwater acoustic full-duplex communication, the system comprising:

an adaptive processor configured to:

receive an output signal from a second receiver, wherein a first receiver and the second receiver are positioned along an axis extending through a center of the first receiver and a center of the second receiver, and wherein the first receiver and the second receiver are separated by a distance approximately equal to a quarter wavelength of a central frequency of the working frequency band; and apply a stochastic gradient adaptive filter to the output signal to: equalize a second amplitude associated with a second signal received by the second receiver from a transmitter positioned on the axis with a first amplitude associated with a first signal received by the first receiver from the transmitter; and equalize a second delay associated with the second signal received by the second receiver from the transmitter with a first delay associated with the first signal received by the first receiver from the transmitter.

* * * * *